US011615346B2

(12) United States Patent
Dai et al.

(10) Patent No.: US 11,615,346 B2
(45) Date of Patent: Mar. 28, 2023

(54) METHOD AND SYSTEM FOR TRAINING MODEL BY USING TRAINING DATA

(71) Applicant: ALIBABA GROUP HOLDING LIMITED, Grand Cayman (KY)

(72) Inventors: Bin Dai, Hangzhou (CN); Shen Li, Hangzhou (CN); Xiaoyan Jiang, Hangzhou (CN); Xu Yang, Hangzhou (CN); Yuan Qi, Hangzhou (CN); Wei Chu, Hangzhou (CN); Shaomeng Wang, Hangzhou (CN); Zihao Fu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1252 days.

(21) Appl. No.: 16/112,592

(22) Filed: Aug. 24, 2018

(65) Prior Publication Data
US 2018/0365521 A1    Dec. 20, 2018

Related U.S. Application Data

(63) Continuation of application No. PCT/CN2017/073340, filed on Feb. 13, 2017.

(30) Foreign Application Priority Data

Feb. 25, 2016 (CN) .................. 201610105840.3

(51) Int. Cl.
G06N 20/20     (2019.01)
G06N 20/00     (2019.01)
(Continued)

(52) U.S. Cl.
CPC ........... *G06N 20/20* (2019.01); *G06K 9/6262* (2013.01); *G06N 7/00* (2013.01); *G06N 20/00* (2019.01)

(58) Field of Classification Search
CPC .. G06K 9/6251; G06K 9/6257; G06K 9/6262; G06N 20/00; G06N 20/20; G06N 7/00
See application file for complete search history.

(56) References Cited

U.S. PATENT DOCUMENTS

2002/0169735 A1    11/2002   Kil et al.
2014/0359761 A1*   12/2014   Altman ............... H04L 63/1441
                                                    726/22
(Continued)

FOREIGN PATENT DOCUMENTS

CN      102609714 A      7/2012
CN      104050242 A      9/2014
(Continued)

OTHER PUBLICATIONS

SIPO International Search Report issued in International Application No. PCT/CN2017/073340, dated Apr. 27, 2017 6 (pages).
(Continued)

*Primary Examiner* — Ming Wu
(74) *Attorney, Agent, or Firm* — Finnegan, Henderson, Farabow, Garrett & Dunner, LLP

(57) ABSTRACT

Embodiments of the present disclosure provide a method and system for training a model by using training data. The training data includes a plurality of samples, each sample includes N features, and features in the plurality of samples form N feature columns, and the method includes: determining an importance value of each of the N feature columns; determining whether the importance value of each of the N feature columns satisfies a threshold condition; performing a dimension reduction on M feature columns to generate P feature columns in response to the determination that the importance values of the M feature columns do not satisfy the threshold condition, wherein M<N and P<M; merging (N−M) feature columns having importance values that satisfy the threshold condition and the generated P feature columns to obtain (N−M+P) feature columns; and training the model based on the training data including the (N−M+P) feature columns.

18 Claims, 8 Drawing Sheets

|  | Feature column 1 | Feature column 2 | Feature column 3 | ...... | Feature column N |
|---|---|---|---|---|---|
| Sample 1 | Value 1, 1 | Value 1, 2 | Value 1, 3 | ...... | Value 1, n |
| Sample 2 | Value 2, 1 | Value 2, 2 | Value 2, 3 | ...... | Value 2, n |
| Sample 3 | Value 3, 1 | Value 3, 2 | Value 3, 3 | ...... | Value 3, n |
| Sample 4 | Value 4, 1 | Value 4, 2 | Value 4, 3 | ...... | Value 4, n |
| Sample 5 | Value 5, 1 | Value 5, 2 | Value 5, 3 | ...... | Value 5, n |
| ...... | ...... | ...... | ...... | ...... | ...... |
| Sample X | Value x, 1 | Value x, 2 | Value x, 3 | ...... | Value x, n |

(51) Int. Cl.
*G06K 9/62* (2022.01)
*G06N 7/00* (2006.01)

(56) References Cited

U.S. PATENT DOCUMENTS

| | | | | |
|---|---|---|---|---|
| 2015/0002704 | A1* | 1/2015 | Vidal-Naquet | H04N 5/2355 348/241 |
| 2015/0003696 | A1* | 1/2015 | Matthews | G06T 7/337 382/128 |
| 2015/0006442 | A1* | 1/2015 | Ogilvie | G06Q 50/01 706/12 |

FOREIGN PATENT DOCUMENTS

| | | |
|---|---|---|
| CN | 104239485 A | 12/2014 |
| CN | 104376326 | 2/2015 |
| CN | 104680121 | 6/2015 |
| CN | 104715021 A | 6/2015 |
| WO | WO 2007/096849 A1 | 8/2007 |
| WO | WO 2017/143914 A1 | 8/2017 |

OTHER PUBLICATIONS

Chinese First Search Report in corresponding with a Chinese Application No. CN 201610105840 mailed Nov. 25, 2020. (1 page).

* cited by examiner

|  | Feature column$^1$ | Feature column$^2$ | Feature column$^3$ | ······ | Feature column$^N$ |
|---|---|---|---|---|---|
| Sample 1 | Value 1, 1 | Value 1, 2 | Value 1, 3 | ······ | Value 1, n |
| Sample 2 | Value 2, 1 | Value 2, 2 | Value 2, 3 | ······ | Value 2, n |
| Sample 3 | Value 3, 1 | Value 3, 2 | Value 3, 3 | ······ | Value 3, n |
| Sample 4 | Value 4, 1 | Value 4, 2 | Value 4, 3 | ······ | Value 4, n |
| Sample 5 | Value 5, 1 | Value 5, 2 | Value 5, 3 | ······ | Value 5, n |
| ······ | ······ | ······ | ······ | ······ | ······ |
| Sample X | Value x, 1 | Value x, 2 | Value x, 3 | ······ | Value x, n |

FIG. 1

| col | IV | IG | col | IV | IG |
|---|---|---|---|---|---|
| 1 | 5.87711.... | 2.20613... | 100022 | 1.07377... | 5.08820... |
| 10 | 3.31695... | 1.38631... | 100024 | 6.04910... | 2.46602... |
| 1000 | 7.82036... | 2.62107... | 100026 | 1.67693... | 5.96912... |
| 100000 | 6.81132... | 2.79715... | 100028 | 6.99528... | 3.59951... |
| 100002 | 7.59792... | 2.44489... | 100031 | 1.76507... | 8.72267... |
| 100004 | 1.50500... | 5.84963... | 100033 | 5.96822... | 2.53824... |
| 100006 | 4.67386... | 2.05491... | 100035 | 2.58702... | 9.15622... |
| 100008 | 3.97857... | 1.43503... | 100037 | 1.62312... | 7.11376... |
| 100011 | 1.42644... | 5.61722... | 100039 | 6.58352... | 2.74432... |
| 100013 | 3.77851... | 1.60399... | 100040 | 1.32737... | 5.41798... |
| 100015 | 1.33614... | 5.74715... | 100042 | 5.18543... | 2.22937... |
| 100017 | 8.06321... | 3.16101... | 100044 | 3.23597... | 1.50824... |
| 100019 | 4.88318... | 1.63962... | 100046 | 1.81776... | 8.01892... |
| 100020 | 1.03414... | 4.33213... |  |  |  |

FIG. 3

METHOD AND SYSTEM FOR TRAINING MODEL BY USING TRAINING DATA

CROSS REFERENCE TO RELATED APPLICATION

The disclosure claims the benefits of priority to International application number PCT/CN2017/073340, filed Feb. 13, 2017, and Chinese application number 201610105840.3, filed Feb. 25, 2016, both of which are incorporated herein by reference in their entireties.

BACKGROUND

In a service of data mining, large-scale training data can be used to train a machine learning algorithm model and carry out classification or regression computation. Only after the machine learning algorithm model is trained by using a large amount of data, can the algorithm model with high prediction precision be obtained, and various behaviors be predicted subsequently according to input data.

There can be billions of or even hundreds of billions of pieces of training data. The scale of each piece of training data can also reach an extremely high order of magnitude with the extension of services.

Using Click-Through Rate (CTR) prediction as an example, the CRT prediction is a key link in Internet computational advertising. The accuracy of the prediction can influence the advertising revenue of a company. The CTR prediction uses a specific algorithm model. Hundreds of billions of pieces of training data may be input to the algorithm model for computation, and each piece of training data can also have tens of billions of feature dimensions. Data input to the algorithm model at such a large scale can easily increase the computation difficulty and reduce the efficiency of the machine learning algorithm model.

To reduce the computation difficulty and improve the computation efficiency, a conventional solution processes training data in a parallel computation manner. For example, a Logistic Regression (LR) model can be used. The LR is a generalized linear model, and can carry out parallel processing. That is, the original massive training data is distributed to N different computing processors (workers) for computation, and the amount of data processed by each computing processor is 1/N of the total data amount.

The foregoing method can be used to process data of a certain order of magnitude. However, if the scale of tens of billions of features is multiplied by hundreds of billions of data, the total data amount may exceed the petabyte (PB) level, exceeding a computing range of a regular computing cluster. It can take an extremely long time to obtain a final optimal result even if the computation could be carried out by using a computing cluster of a super large scale, which results in low operation efficiency and cannot meet a service update requirement.

In addition, training data may have problems such as low dimensions and a small data amount, which also affect the training precision of the machine learning model.

SUMMARY OF THE DISCLOSURE

Embodiments of the disclosure provide a method for training a model by using training data, wherein the training data comprises a plurality of samples, each sample comprises N features, and features in the plurality of samples form N feature columns. The method can include: determining an importance value of each of the N feature columns; determining whether the importance value of each of the N feature columns satisfies a threshold condition; performing, among the N feature columns, a dimension reduction on M feature columns to generate P feature columns in response to the determination that the importance values of the M feature columns do not satisfy the threshold condition, wherein M<N and P<M; merging (N−M) feature columns having importance values that satisfy the threshold condition and the generated P feature columns to obtain (N−M+P) feature columns; and training the model based on the training data including the (N−M+P) feature columns.

Embodiments of the disclosure provide a method for training a model by using training data, wherein the training data comprises a plurality of samples, each sample comprises N features, and features in the plurality of samples form N feature columns. The method can include: determining an importance value of each of the N feature columns; determining whether the importance value of each feature column satisfies a threshold condition; performing a dimension raising on Q feature columns to generate R feature columns in response to the determination that the importance values of the Q feature columns in the N feature columns satisfies the threshold condition, wherein R>Q and Q<N; merging the generated R feature columns and (N−Q) feature columns having importance values that are less than or equal to the threshold to obtain (R+N−Q) feature columns; and training the model based on the training data including the (R+N−Q) feature columns.

Embodiments of the disclosure provide further provide a system for training a model by using training data, wherein the training data comprises a plurality of samples, each sample comprises N features, and features in the samples form N feature columns. The system can include: a first calculation module configured to determine an importance value of each of the N feature columns; a first determination module configured to determine whether the importance value of each feature column satisfies a threshold condition; a first dimension reduction module configured to perform, among the N feature columns, a dimension reduction on M feature columns to generate P feature columns in response to the determination that the importance values of the M feature columns in the N feature columns does not satisfy the threshold condition, wherein M<N and P<M; a first merging module configured to merge (N−M) feature columns having importance values that satisfy the threshold condition and the generated P feature columns to obtain (N−M+P) feature columns; and a first training module configured to train the model based on the training data comprising the (N−M+P) feature columns, wherein the satisfaction of the threshold condition occurs when the importance value is greater than or equal to a threshold.

Embodiments of the disclosure provide further a system for training a model by using training data, wherein the training data comprise a plurality of samples, each sample comprises N features, and features in the samples form N feature columns. The system can include: a second calculation module configured to determine an importance value of each of the N feature columns; a second determination module configured to determine whether the importance value of each feature column satisfies a threshold condition; a dimension raising module configured to perform a dimension raising on Q feature columns to generate R feature columns in response to the determination that the importance values of the Q feature columns in the N feature columns satisfies the threshold condition, wherein R>Q and Q<N; a second merging module configured to merge the generated R feature columns and (N−Q) feature columns having importance values that do not satisfy the threshold condition to obtain (R+N−Q) feature columns; and a second training module configured to input training data comprising the (R+N−Q) feature columns to a machine learning algorithm model to train the machine learning algorithm model, wherein the satisfaction of the threshold condition occurs when the importance value is greater than a threshold.

BRIEF DESCRIPTION OF THE DRAWINGS

FIG. 1 is a schematic diagram of training data according to embodiments of the present disclosure.

FIG. 3 is a schematic diagram of an output result of importance values of feature columns according to embodiments of the present disclosure.

DETAILED DESCRIPTION

The technical solutions in the embodiments of the present disclosure will be described clearly and completely below with reference to the accompanying drawings in the embodiments of the present disclosure. Apparently, the described embodiments are only some embodiments rather than all embodiments of the present disclosure. All other embodiments derived by those of ordinary skill in the art based on the embodiments in the present disclosure shall belong to the protection scope of the present disclosure.

Embodiments of the present disclosure provide a method and system for training a model by using training data. In the method or system, feature columns can be selected first. Important feature columns and auxiliary feature columns can be selected by determining an importance value of each feature column and determining whether the importance value of each feature column is less than a corresponding threshold. Next, dimension reduction processing can be performed on multiple auxiliary feature columns. Then, the important feature columns and the auxiliary feature columns after the dimension reduction processing can be merged and input to a machine learning algorithm model to train the machine learning algorithm model.

Figure 2:
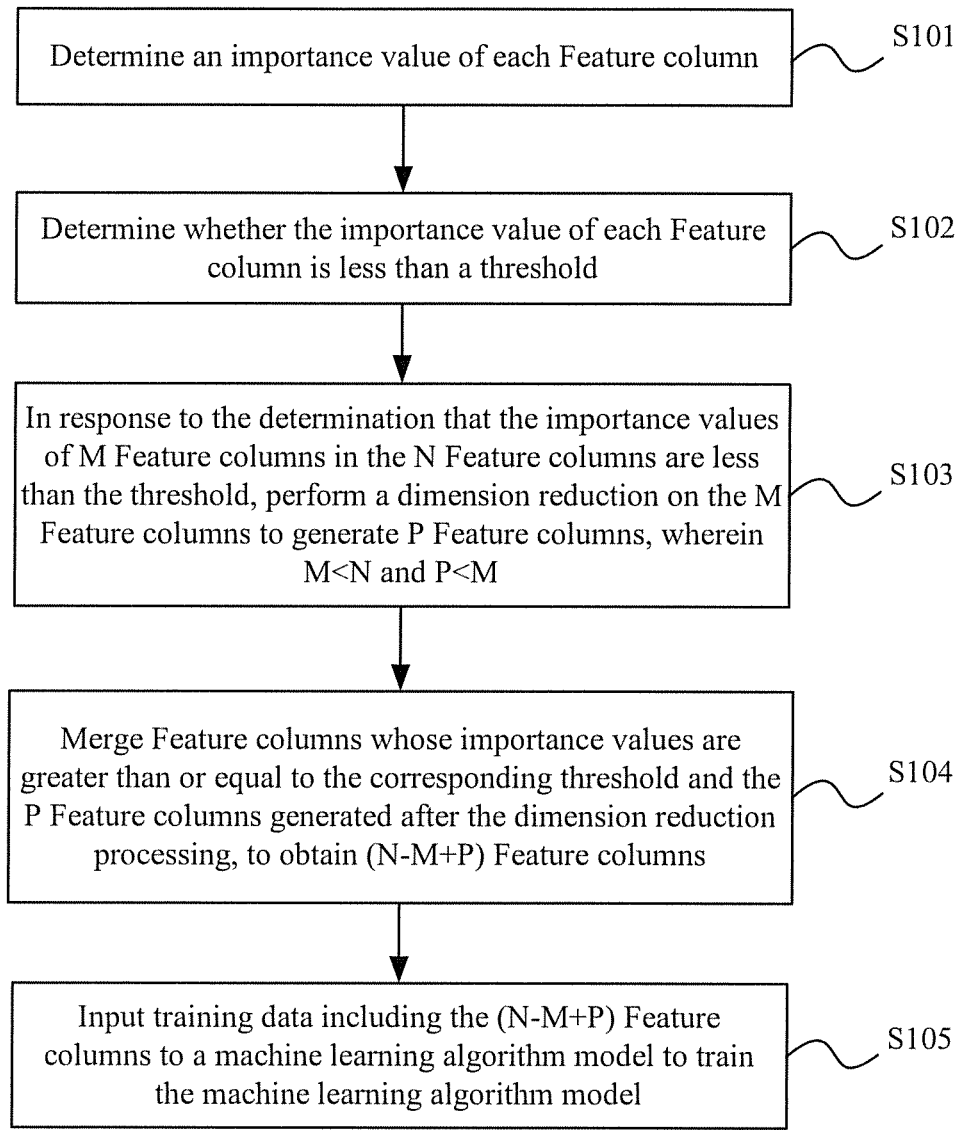
FIG. 2 is a flowchart of a method for training a model by using training data according to embodiments of the present disclosure.

Embodiments of the present disclosure provide a method for training a model by using training data. FIG. 1 is a schematic diagram of training data according to embodiments of the present disclosure. FIG. 2 is a flowchart of a method for training a model by using training data. The method for training a model by using training data can be used for training various machine learning algorithm models. For example, the method for training a model by using training data provided by the present disclosure can be applied to training data with high-dimension sparse features. As shown in FIG. 1, the training data can include multiple samples, each sample includes N features, and corresponding features in the multiple samples can form N feature columns.

As shown in FIG. 2, the method for training a model by using training data can include steps S101-S105.

In step S101, an importance value of each feature column can be determined. In this step, the importance value can be used for evaluating an importance degree of the feature column with respect to the prediction accuracy of the model after training. For example, the importance value can be an information value (IV) or an information gain (IG) of the feature column.

When the importance value of the feature column is an IV, the importance value can be determined by using the following formulas, for example, in a dimidiate model:

$$WoE = \ln(pctlGood/pctlbad) \quad (1)$$

$$MIV = WoE*(pctlGood - pctlbad) \quad (2)$$

$$IV = \Sigma MIV \quad (3)$$

The dimidiate model can be a credit card scoring model widely used in foreign countries. The dimidiate model is particularly widely used in the credit risk evaluation field and financial risk control field. The dimidiate model is a generalized linear model of dichotomous-variables, which hashes a model variable WoE in a coding manner and then determines the IV value by using a logistic regression model. In this model, each piece of training data is information of each credit card user. The training data includes multiple features, such as age, profession, and gender of the credit card user. Each piece of training data corresponds to a tag value. When the credit card user is a defaulting user, the tag value is recorded as 1, and when the credit card user is a normal user, the tag value is recorded as 0.

In formula (1), WoE represents Weight of Evidence, and a WoE value can be determined before the calculation of the IV value.

In formula (1), pctlGood and pctlBad are determined according to features in feature columns of multiple pieces of training data and the tag value corresponding to each piece of data. After hashing a certain feature column (such as "ages of credit card users"), pctlGood represents a number of credit card users whose tag values are 1 within an interval and a number of credit card users whose target values are 1 in all intervals, and pctlBad represents a number of credit card users whose tag values are 0 in an interval and a number of credit card users whose target values are 0 in all the intervals.

For example, Table 1 shows WoE values corresponding to age intervals after ages of credit card users being hashed.

TABLE 1

| Age | #Good | #Bad | WoE |
|---|---|---|---|
| 0-10 | 50 | 200 | =ln((50/100)/(200/1000)) = ln((50/200)/(100/1000)) |
| 10-18 | 20 | 200 | =ln((20/100)/(200/1000)) = ln((20/200)/(100/1000)) |
| 18-35 | 5 | 200 | =ln((5/100)/(200/1000)) = ln((5/200)/(100/1000)) |
| 35-50 | 15 | 200 | =ln((15/100)/(200/1000)) = ln((15/200)/(100/1000)) |
| Above 50 | 10 | 200 | =ln((10/100)/(200/1000)) = ln((10/200)/(100/1000)) |
| Summary | 100 | 1000 | |

After the WoE is determined, an MIV value of each age interval can be determined according to formula (2), and then a total of the MIV values of all the age intervals can be determined according to formula (3). Therefore, an IV value of the feature column in all the age intervals can be obtained.

When the importance value is an IG of the feature column, the IG Gain(S, A) is defined as follows:

$$\text{Gain }(S, A) = \text{Entropy }(S) - \sum_{v \in V(A)} \frac{|S_v|}{|S|} \text{Entropy }(S_v) \quad (4)$$

In formula (4), Entropy(S) is entropy of a data set S, V(A) is a set of all possible values of a feature column A, Sv is a subset of S in which the value of a certain feature column A is v. The weight is a ratio |Sv|/|S| of samples of a certain feature column Sv to original samples S. That is, Gain(S, A) is information about a target function value obtained from a value of a given feature column A.

After the IV value and/or the IG value are determined, the obtained IV value and/or the IG value can be output. FIG. 3 is a schematic diagram of an output result, according to embodiments of the disclosure. In FIG. 3, the "col" represents a feature name, the "IV" represents the information value, and the "IG" represents the information gain.

Methods for determining the IV value and IG value of each feature column have been described with examples. It is appreciated that there are many other values in this field that can be used for evaluating the importance degree of the feature column with respect to the prediction accuracy of the model after training, and there are also various calculation methods. The present disclosure does not particularly limit the type of the importance value and the calculation method.

Referring back to FIG. 2, in step S102, it is determined whether the importance value of each feature column is less than a threshold. In this step, for example, it can be determined according to the importance value of each feature column calculated in step S101 whether the importance value is less than the corresponding threshold.

For example, it can be determined according to the IV value of each feature column calculated in step S101 whether the IV value is less than a corresponding threshold. For example, the threshold corresponding to the IV value of the feature column is a first threshold B. In this step, the IV value of each feature column is compared with the first threshold B.

Similarly, it can be determined, according to the IG value of each feature column, whether the IG value is less than a corresponding threshold. For example, the threshold corresponding to the IG value of the feature column is a second threshold C. In this step, the IG value of each feature column can be compared with the second threshold C.

In addition, it is also possible to simultaneously determine whether the IV value and the IG value of each feature column are both less than corresponding thresholds. For example, for each feature column, it can be determined whether the IV value of the feature column is less than the first threshold B, and it can be further determined whether the IG value of the feature column is less than the second threshold C.

In step S103, when it is determined that the importance values of M feature columns in the N feature columns are less than the corresponding threshold, dimension reduction processing can be performed on the M feature columns to generate P feature columns, wherein M<N and P<M.

In this step, by comparing the IVs and/or the IGs with the corresponding threshold, it can be determined which feature columns are important features and which feature columns are auxiliary features. That is, feature columns having a great influence on the prediction accuracy of the model after training can be regarded as important features, and feature columns having a small influence on the prediction accuracy of the model after training can be regarded as auxiliary features.

If the comparison merely involves IV values, it can be considered that feature columns having IV values that are less than the first threshold B are auxiliary features, and feature columns having IV values that are greater than or equal to the first threshold B are important features.

If the comparison merely involves IG values, it can be considered that feature columns having IG values that are less than the second threshold C are auxiliary features, and feature columns having IG values that are greater than or equal to the second threshold C are important features.

If the comparison involves both the IV values and the IG values, it can be considered that feature columns having IV values that are less than the first threshold B are auxiliary features or feature columns having IG values that are less than the second threshold C are auxiliary features, and only feature columns having IV values that are greater than or equal to the first threshold B and IG values are greater than or equal to the second threshold C can be considered as important features.

The step of performing dimension reduction processing on the M feature columns having IVs and/or IGs that are less than the corresponding threshold is described below by using an example below.

For example, a piece of training data includes three samples, and each sample includes N features. The three samples are:

A1 $(a_{11}, a_{12}, a_{13}, \ldots a_{1N})$
A2 $(a_{21}, a_{22}, a_{23}, \ldots a_{2N})$
A3 $(a_{31}, a_{32}, a_{33}, \ldots a_{3N})$ Step S101 of determining the importance value of each feature column can include, for example, determining an IV and/or an IG of the feature column consisting of $a_{11}, a_{21},$ and $a_{31}$, an IV and/or an IG of the feature column consisting of $a_{12}, a_{22},$ and $a_{32}$, an IV and/or an IG of the feature column consisting of $a_{13}, a_{23},$ and $a_{33}, \ldots,$ and an IV and/or an IG of the feature column consisting of $a_{1N}, a_{2N},$ and $a_{3N}$.

In step S103, based on the result of whether the importance value of each feature column is less than the corresponding threshold obtained in step S102, the multiple feature columns can be classified into important features and auxiliary features. In this example, the important features are, for example, the feature column consisting of $(a_{11}, a_{21}, a_{31})$, the feature column consisting of $(a_{12}, a_{22}, a_{32}), \ldots,$ and the feature column consisting of $(a_{1(N-m)}, a_{2(N-m)}, a_{3(N-M)})$. The auxiliary features are the last M columns, including the feature column consisting of $(a_{1(N-M+1)}, a_{2(N-M+1)}, a_{3(N-M+1)}), \ldots,$ and the feature column consisting of $(a_{1N}, a_{2N}, a_{3N})$.

In step S103, dimension reduction processing can be performed on the M auxiliary features to convert the auxiliary features into a number (e.g., P) of feature columns. For example, the original $(a_{1(N-M+1)}, a_{1(N-M+2)} \ldots a_{1N})$, $(a_{2(N-M+1)}, a_{2(N-M+2)} \ldots a_{2N}),$ and $(a_{3(N-M+1)}, a_{3(N-M+2)} \ldots a_{3N})$ can be converted into $(a'_{1(N-M+1)}, a'_{1(N-M+2)} \ldots a'_{1(N-M+P)})$, $(a'_{2(N-M+1)}, a'_{2(N-M+2)} \ldots a'_{2(N-M+P)}),$ and $a'_{3(N-M+1)}, a'_{3(N-M+2)} \ldots a'_{3(N-m+P)})$ through dimension reduction processing respectively.

Step S103 can be implemented, for example, by using a hashing algorithm (e.g., a minwise hashing algorithm). The minwise hashing algorithm can be widely applied to information retrieval in massive data. In this algorithm, the dimension of the auxiliary features is reduced to b bits (b=64 bits), which reduces the storage space and computing time.

For example, the algorithm can be implemented as follows:

---

Algorithm 1 The b-bit minwise hashing algorithm, applied to estimating pairwise resemblances in a collection of N sets.

Input: Sets $S_n \in \Omega = \{0, 1, \ldots, D - 1\}$, n = 1 to N.
Pre-processing:
1): Generate k random permutations $\pi_j: \Omega \to \Omega$, j = 1 to k.
2): For each set $S_n$ and each permutation $\pi_j$, store the lowest b bits of min $(\pi_j (S_n))$, denoted by $e_{n,i,j}$, i = 1 to b.
Estimation: (Use two sets $S_1$ and $S_2$ as an example.)

1): Compute $\hat{E}_b = \dfrac{1}{k} \sum\limits_{j=1}^{k} \left\{ \prod\limits_{i=1}^{b} 1\{e_{1,i,\pi_j} = e_{2,i,\pi_j}\} = 1 \right\}$.

2): Estimate the resemblance by $\hat{R}_b = \dfrac{\hat{E}_b - C_{1,b}}{1 - C_{2,b_l}}$, where $C_{1,b}$ and $C_{2,b}$ are from Theorem 1 in Sec. 2.

---

By using the minwise hashing algorithm, the original auxiliary features can be converted into a vector with $k \times 2^b$ dimensions, wherein k and b are algorithm specified parameters. For example, $P = k \times 2^b$ in step S103.

In addition, step S103 is not limited to the minwise hashing algorithm, and also can be implemented by using an algorithm such as principle component analysis (PCA), Linear Discriminant Analysis (LDa), locally linear embedding (LLE), and Laplacian Eigenmaps, which are not particularly limited here.

In step S104, (N−M) feature columns having importance values that are greater than or equal to the corresponding threshold and the P feature columns generated after the dimension reduction processing can be merged to obtain (N−M+P) feature columns.

In this step, (N−M) feature columns obtained in step S102 can be merged with the P feature columns to obtain new training data including (N−M+P) feature columns.

For example, the (N−M) feature columns can include:
A1"($a_{11}, a_{12} \ldots a_{1(N-M)}$)
A2"($a_{21}, a_{22} \ldots a_{2(N-M)}$)
A3"($a_{31}, a_{32} \ldots a_{3(N-M)}$),
The auxiliary features can include:
A1'''($a'_{1(N-M+1)}, a'_{1(N-M+2)} \ldots a'_{1(N-M+P)}$)
A2'''($a'_{2(N-M+1)}, a'_{2(N-M+2)} \ldots a'_{2(N-M+P)}$)
A3'''($a'_{3(N-M+1)}, a'_{3(N-M+2)} \ldots a'_{3(N-M+P)}$)
The result of merging the (N−M) feature columns and the P feature columns can be:
A1""($a_{11}, a_{12}, \ldots a_{1(N-M)}, \ldots a_{1(N-M+P)}$)
A2""($a_{21}, a_{22}, \ldots a_{2(N-M)}, \ldots a_{2(N-M+P)}$)
A3""($a_{31}, a_{32}, \ldots a_{3(N-M)}, \ldots a_{3(N-M+P)}$)
The training data generated after merging can be referred to as a feature fingerprint. The training data generated after merging has (N−M+P) feature dimensions, which is shorter than the original N feature dimensions. For example, if the training data includes 100,000,000 feature columns, when k=200 and b=12, and the first 10,000 feature columns are taken as important features, the number of generated feature columns is:

200×2^12+10,000=829,200.

A dimension reduction ratio is approximately 829,200/100,000,000=0.008292, and the features and data are less than 1% of the original features and data.

In step S105, training data including the (N−M+P) feature columns can be input to a machine learning algorithm model to train the machine learning algorithm model. In this step, the merged multiple samples can be input to the machine learning algorithm model to train the machine learning algorithm model, or the machine learning algorithm model can be used for prediction. The machine learning algorithm model can be a classification algorithm model or a regression algorithm model, such as a logistic regression (LR) algorithm model, a random forest algorithm model, and a Gradient Boost Decision Tree algorithm model, which are not limited in the present disclosure.

The method for training a model by using training data according to embodiments of the present disclosure determines an IV and/or an IG of each feature column, and reduces dimensions of original training data with high feature dimensions by retaining important features and reducing dimensions of auxiliary features. When the dimension-reduced training data is input to a model for training, objectives of making training feature parameters controllable, significantly reducing training data and improving operation efficiency can be achieved. Meanwhile, as embodiments of the present disclosure retains the important features while reducing dimensions of the auxiliary features, a decrease in prediction accuracy of the model can be minimized. The method for training a model by using training data can have a particularly evident effect when applied to the training data with high-dimension sparse features (for example, advertisement CTR data). With the foregoing changes to the advertisement CTR data with 100,000,000 features, the AUC can be improved by 2% compared with the full-amount training, and the data amount is 1% of the original data amount.

Figure 4:
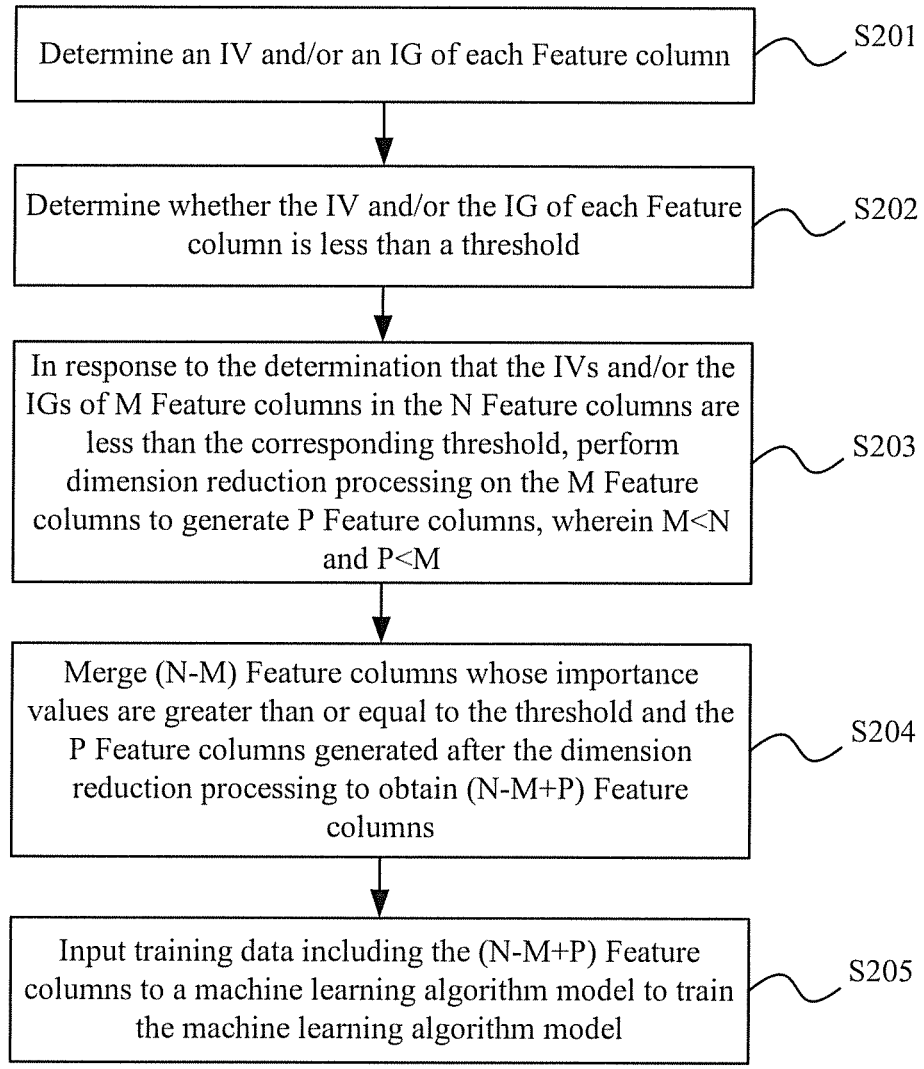
FIG. 4 is a flowchart of a method for training a model by using training data according to embodiments of the present disclosure.

Embodiments of the present disclosure further provide a method for training a model by using training data. FIG. 4 is a flowchart of a method for training a model by using training data, according to embodiments of the present disclosure. The method for training a model by using training data can be used for training various machine learning algorithm models. For example, the method for training a model by using training data can be applied to training data with high-dimension sparse features. In a high-dimension sparse matrix, for example, a ratio of the total number of dimensions to the number of dimensions having values is 100:1, 1,000:1 or higher. The training data includes multiple samples, each sample includes N features, and corresponding features in the multiple samples form N feature columns.

As shown in FIG. 4, the method for training a model by using training data can include steps S201-S205.

In step S201, an IV and/or an IG of each feature column can be determined. In this step, the IV or the IG can evaluate the importance degree of the feature column with respect to the prediction accuracy of the model after training.

When the importance value is an IV of the feature column, the importance value can be determined by above formulas (1)-(3) in, for example, a dimidiate model. After the IV value and/or the IG value is determined by using the foregoing method, the obtained IV value and/or IG value can be output. FIG. 3 is a schematic diagram of an output result. In FIG. 3, the col column represents a feature name, IV represents the information value, and IG represents the information gain.

Referring back to FIG. 4, in step S202, it can be determined whether the IV and/or the IG of each feature column is less than a corresponding threshold. In this step, for example, it can be determined according to the IV and/or the IG of each feature column calculated in step S201 whether the IV and/or the IG is less than the corresponding threshold.

For example, it can be determined, according to the IV value of each feature column, whether the IV value is less than a corresponding threshold. For example, the threshold corresponding to the IV value of the feature column is a first threshold B. In this step, the IV value of each feature column is compared with the first threshold B.

Similarly, it can be determined according to the IG value of each feature column determined in step S201 whether the IG value is less than a corresponding threshold. For example, the threshold corresponding to the IG value of the feature column is a second threshold C. In this step, the IG value of each feature column is compared with the second threshold C.

In addition, it is also possible to simultaneously determine whether the IV value and the IG value of each feature column are simultaneously less than corresponding thresholds. For example, for each feature column, it is determined whether the IV value of the feature column is less than the first threshold B, and it is further determined whether the IG value of the feature column is less than the second threshold C.

In step S203, when it is determined that the IVs and/or the IGs of M feature columns in the N feature columns are less than the corresponding threshold, dimension reduction processing can be performed on the M feature columns to generate P feature columns, wherein M<N and P<M. In this step, by comparing the IVs and/or the IGs with the corresponding threshold, it can be determined which feature columns are important features and which feature columns are auxiliary features. That is, feature columns that have a great influence on the prediction accuracy of the model after training can be regarded as important features, and feature columns that have a small influence on the prediction accuracy of the model after training can be regarded as auxiliary features.

If the comparison merely involves IV values, it can be considered that feature columns having IV values that are less than the first threshold B are auxiliary features, and feature columns having IV values that are greater than or equal to the first threshold B are important features.

If the comparison merely involves IG values, it can be considered that feature columns having IG values that are less than the second threshold C are auxiliary features, and feature columns having IG values that are greater than or equal to the second threshold C are important features.

If the comparison involves both the IV values and the IG values, it can be considered that feature columns having IV values that are less than the first threshold B are auxiliary features or feature columns having IG values that are less than the second threshold C are auxiliary features, and only feature columns having IV values that are greater than or equal to the first threshold B and IG values are greater than or equal to the second threshold C can be considered as important features.

Step S203 can be implemented, for example, by using a hashing algorithm (e.g., a minwise hashing algorithm). The minwise hashing algorithm is widely applied to information retrieval in massive data. In this algorithm, (b=64 bits) is reduced to b bits, which reduces the storage space and computing time.

This algorithm has been described above, and details will not be described here again.

By using the minwise hashing algorithm, the original auxiliary features are converted into a vector with $k \times 2^b$ dimensions, wherein k and b are algorithm specified parameters, that is, $P=k \times 2^b$ in step S203.

In step S204, (N−M) feature columns having importance values that are greater than or equal to the corresponding threshold and the P feature columns generated after the dimension reduction processing can be merged to obtain (N−M+P) feature columns.

In this step, (N−M) feature columns can be merged with the P feature columns to obtain new training data.

For example, the (N−M) feature columns having IVs and/or IGs that are greater than or equal to the corresponding threshold are:

A1″($a_{11}, a_{12} \ldots a_{1(N-M)}$)
A2″($a_{21}, a_{22} \ldots a_{2(N-M)}$)
A3″($a_{31}, a_{32} \ldots a_{3(N-M)}$)

The auxiliary features generated after the dimension reduction processing are:

A1‴($a'_{1(N-M+1)}, a'_{1(N-M+2)} \ldots a'_{1(N-M+P)}$)
A2‴($a'_{2(N-M+1)}, a'_{2(N-M+2)} \ldots a'_{2(N-M+P)}$)
A3‴($a'_{3(N-M+1)}, a'_{3(N-M+2)} \ldots a'_{3(N-M+P)}$)

The result of merging the (N−M) feature columns having IVs and/or IGs that are greater than or equal to the corresponding threshold and the P feature columns generated after the dimension reduction processing is:

A1⁗($a_{11}, a_{12}, \ldots a_{1(N-M)}, \ldots a_{1(N-M+P)}$)
A2⁗($a_{21}, a_{22}, \ldots a_{2(N-M)}, \ldots a_{2(N-M+P)}$)
A3⁗($a_{31}, a_{32}, \ldots a_{3(N-M)}, \ldots a_{3(N-M+P)}$)

The training data generated after merging can be referred to as a feature fingerprint. The training data generated after merging has (N−M+P) feature dimensions, which is shorter than the original N feature dimensions. For example, if the training data includes 100,000,000 feature columns, when k=200 and b=12, and the first 10,000 feature columns are taken as important features, the number of generated feature columns is: $200 \times 2^{12}+10,000=829,200$. A dimension reduction ratio is approximately 829,200/100,000,000=0.008292, and the features and data are less than 1% of the original features and data. Meanwhile, since embodiments of the present disclosure retains the important features and reduces dimensions of the auxiliary features, the feature fingerprint can still comprehensively reflect the original training data and will not reduce the training accuracy.

In step S205, training data including the (N−M+P) feature columns can be input to a machine learning algorithm model to train the machine learning algorithm model.

In this step, the merged multiple samples can be input to the machine learning algorithm model to train the machine learning algorithm model, or the machine learning algorithm model is used for prediction. The machine learning algorithm model can be a classification algorithm model or a regression algorithm model, such as a LR algorithm model, a random forest algorithm model, and a Gradient Boost Decision Tree algorithm model, which are not limited in the present disclosure.

The method for training a model by using training data proposed according to the second embodiment of the present disclosure determines an IV and/or an IG of each feature column, and reduces dimensions of original training data with high feature dimensions by retaining important features and reducing dimensions of auxiliary features. When the dimension-reduced training data is input to a model for training, objectives of making training feature parameters controllable, significantly reducing training data and improving operation efficiency can be achieved. Meanwhile, as embodiments of the present disclosure retains the important features while reducing dimensions of the auxiliary features, the feature fingerprint can still comprehensively reflect the original training data, and a decrease in prediction accuracy of the model is minimized. The method for training a model by using training data proposed in the present disclosure has a particularly evident effect when applied to the training data with high-dimension sparse features, for example, advertisement CTR data. With the foregoing changes on the advertisement CTR data with 100,000,000 features, the AUC is improved by 2% compared with the full-amount training, and the data amount is 1% of the original data amount.

Figure 5:
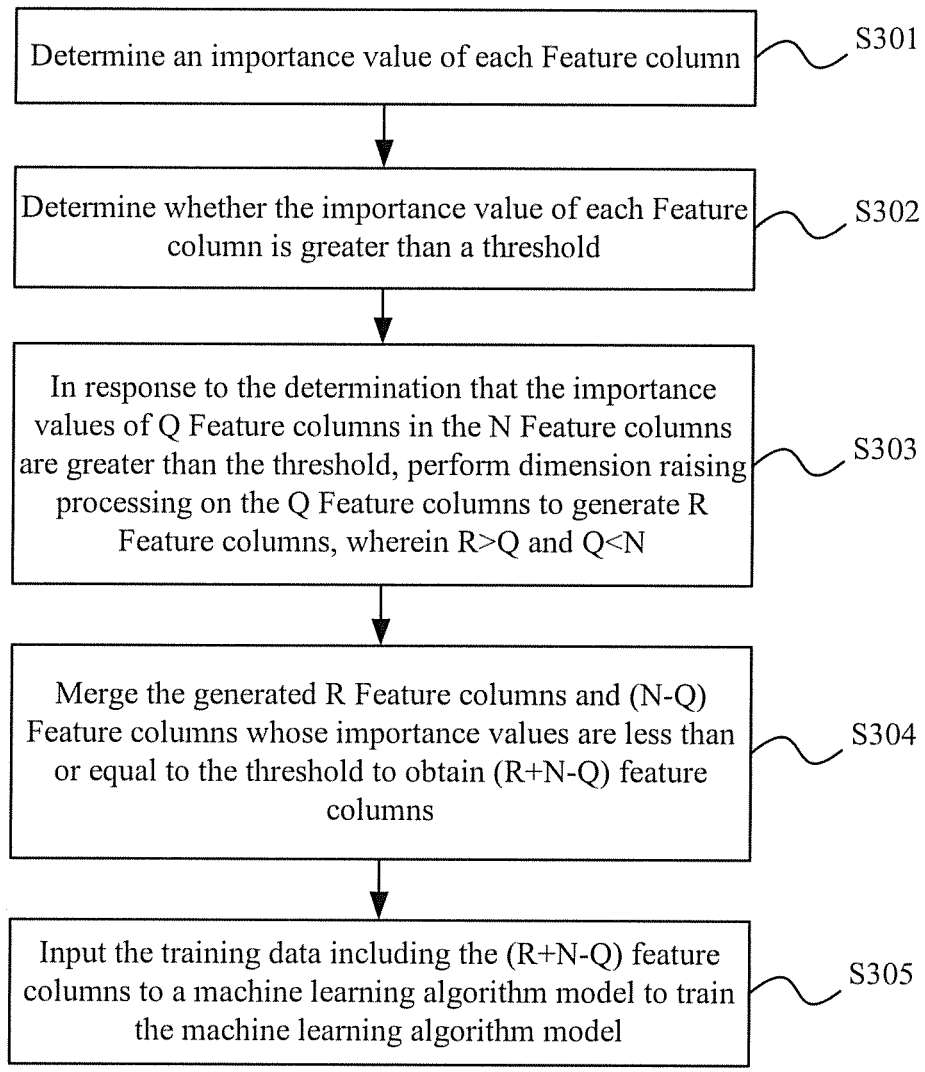
FIG. 5 is a flowchart of a method for training a model by using training data according to embodiments of the present disclosure.

Embodiments of the present disclosure further provide a method for training a model by using training data. FIG. 5 is a flowchart of a method for training a model by using training data, according to embodiments of the present disclosure. The method for training a model by using training data can be used for training various machine learning algorithm models. For example, the method for training a model by using training data can be applied to training data with high-dimension sparse features. In a high-dimension sparse matrix, for example, a ratio of the total number of dimensions to the number of dimensions having values is 100:1 or 1,000:1 or above. The training data includes multiple samples, each sample includes N features, and corresponding features in the multiple samples form N feature columns.

As shown in FIG. 5, the method for training a model by using training data according to embodiments of the present disclosure can include steps S301-S305.

In step S301, an importance value of each feature column can be determined.

In step S302, it can be determined whether the importance value of each feature column is greater than a corresponding threshold.

In step S303, when it is determined that the importance values of Q feature columns in the N feature columns are greater than the corresponding threshold, dimension raising processing can be performed on the Q feature columns to generate R feature columns, wherein R>Q and Q<N.

In step S304, the R feature columns generated after the dimension raising processing and feature columns having importance values that are less than or equal to the corresponding threshold can be merged.

In step S305, merged training data can be input to a machine learning algorithm model to train the machine learning algorithm model.

Steps S301 and S305 can be the same as or similar to steps S201 and S205, and will not be described in detail again here.

In step S302, it can be determined whether the importance value is greater than a corresponding threshold. The manner for determining whether the importance value is greater than a corresponding threshold can be similar to that of step S102, and will not be described in detail herein.

For step S303, for example, reference can be made to the method in step S103. Based on the result of whether the importance value of each feature column is greater than the corresponding threshold obtained in step S302, the multiple feature columns are classified into important features and auxiliary features. In this example, the important features are, for example, the feature column consisting of $(a_{11}, a_{21}, a_{31})$, the feature column consisting of $(a_{12}, a_{22}, a_{32})$, ..., and the feature column consisting of $(a_{1Q}, a_{2Q}, a_{3Q})$; the auxiliary features are the last (N–Q) columns, that is, the feature column consisting of $(a_{1(Q+1)}, a_{2(Q+2)}, a_{3(Q+3)})$, ..., and the feature column consisting of $(a_{1N}, a_{2N}, a_{3N})$.

In step S303, dimension raising processing can be performed on the Q important features having importance values that are greater than the threshold to convert the important features into R feature columns. That is, the original $(a_{11}, a_{12} \ldots a_{1Q})$, $(a_{21}, a_{22} \ldots a_{2Q})$, and $(a_{31}, a_{32} \ldots a_{3Q})$ can be converted into $(a'_{11}, a'_{12}, \ldots a'_{1R})$, $(a'_{21}, a'_{22} \ldots a'_{2R})$ and $(a'_{31}, a'_{32} \ldots a'_{3R})$ through dimension raising processing respectively.

Step S303 can be implemented, for example, by using a hashing algorithm (e.g., a minwise hashing algorithm). The minwise hashing algorithm is widely applied to information retrieval in massive data. In this algorithm, (b=64 bits) is expanded to b bits through parameter setting to raise dimensions of the important features. For the implementation of the algorithm, reference can be made to step S103. Details are not described here again.

In S304, for example, the R feature columns generated after the dimension raising processing can be merged with the (N–Q) feature columns, having importance values that are less than or equal to the corresponding threshold. Reference can be made to step S103, and details are not described here again.

In addition, in step S303, when it is determined that the importance values of Q feature columns in the N feature columns are greater than the corresponding threshold, dimension raising processing can be performed on the Q feature columns by using a minwise Hashing algorithm to generate R feature columns, wherein $R=k \times 2^b$, and k and b are algorithm specified parameters.

In some embodiments, the importance value can be the IV or IG in the second embodiment. Details are not repeated herein.

In addition, after step S302, the method can further include a step S302a.

In step S302a, when it is determined that the importance values of M feature columns in the N feature columns are less than the corresponding threshold, dimension reduction processing can be performed on the M feature columns to generate P feature columns, wherein M<N and P<M.

For example, step S304 of merging the R feature columns and P feature columns can include: merging the R feature columns generated after the dimension raising processing and the P feature columns generated after the dimension reduction processing to generate (R+P) feature columns.

In step S305, for example, the merged training data including (R+P) feature columns can be input to a machine learning algorithm model to train the machine learning algorithm model.

The method for training a model by using training data can determine an importance value of each feature column, and can raise dimensions of training data with high importance values in small-scale training data by raising dimensions of important features, thus improving the accuracy of model training.

Figure 6:
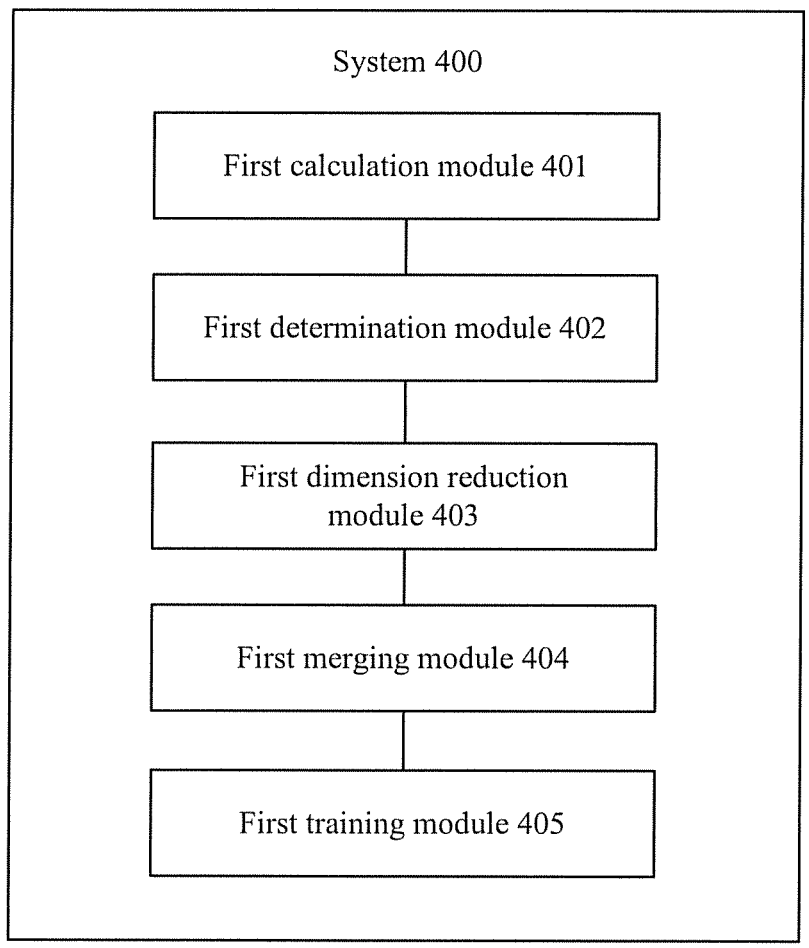
FIG. 6 is a block diagram of a system for training a model by using training data according to embodiments of the present disclosure.

Embodiments of the present disclosure can further provide a system for training a model by using training data. The training data includes multiple samples, each sample includes N features, and corresponding features in the multiple samples form N feature columns. FIG. 6 is a schematic diagram of a system 400 for training a model by using training data and the training data according to embodiments of the present disclosure. System 400 includes a first calculation module 401, a first judgment module 402, a first dimension reduction module 403, a first merging module 404, and a first training module 405.

First calculation module 401 can be configured to determine an importance value of each feature column.

First determination module 402 can be configured to determine whether the importance value of each feature column is less than a corresponding threshold.

First dimension reduction module 403 can be configured to perform dimension reduction processing on M feature columns to generate P feature columns when it is determined that the importance values of the M feature columns in the N feature columns are less than the corresponding threshold, wherein M<N and P<M.

First merging module 404 can be configured to merge (N−M) feature columns having importance values that are greater than or equal to the corresponding threshold and the P feature columns generated after the dimension reduction processing.

First training module 405 can be configured to input the merged multiple samples to a machine learning algorithm model to train the machine learning algorithm model.

System 400 for training a model by using training data can determine an importance value of each feature column, and reduce dimensions of original training data with high feature dimensions by retaining important features and reducing dimensions of auxiliary features. When the dimension-reduced training data is input to a model for training, objectives of making training feature parameters controllable, significantly reducing training data and improving operation efficiency can be achieved. Meanwhile, as the embodiments of the present disclosure retain the important features while reducing dimensions of the auxiliary features, a decrease in prediction accuracy of the model is minimized.

Figure 7:
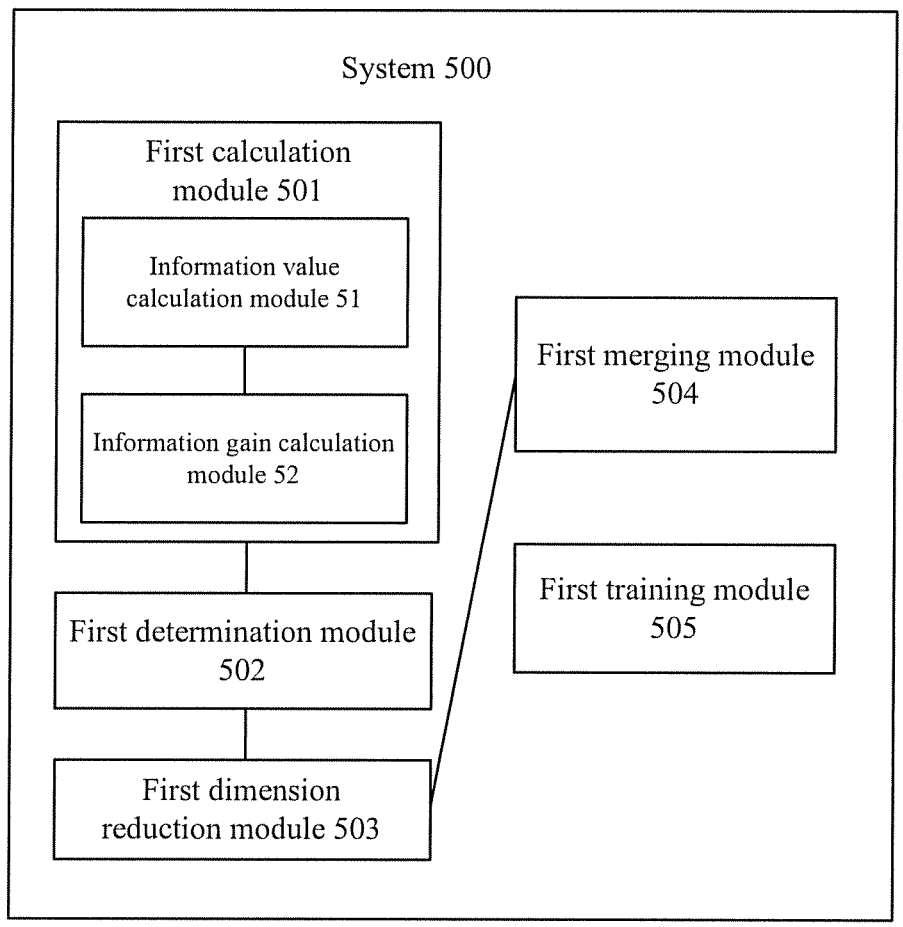
FIG. 7 is a block diagram of a system for training a model by using training data according to embodiments of the present disclosure.

Embodiments of the present disclosure further provide a system for training a model by using training data. The training data includes multiple samples, each sample includes N features, and corresponding features in the multiple samples form N feature columns. FIG. 7 is a schematic diagram of a system 500 for training a model by using training data and the training data, according to embodiments of the present disclosure. System 500 can include a first calculation module 501, a first judgment module 502, a first dimension reduction module 503, a first merging module 504, and a first training module 505.

First calculation module 501 can be configured to determine an importance value of each feature column.

First determination module 502 can be configured to determine whether the importance value of each feature column is less than a corresponding threshold.

First dimension reduction module 503 can be configured to perform dimension reduction processing on M feature columns to generate P feature columns when it is determined that the importance values of the M feature columns in the N feature columns are less than the corresponding threshold, wherein M<N and P<M.

First merging module 504 can be configured to merge (N−M) feature columns having importance values that are greater than or equal to the corresponding threshold and the P feature columns generated after the dimension reduction processing.

First training module 505 can be configured to input the merged multiple samples to a machine learning algorithm model to train the machine learning algorithm model.

In some embodiments, the training data can further include a tag value corresponding to each sample, the importance value is an IV and/or an IG.

First calculation module 501 can include: an information value calculation module 51 configured to determine an IV of the feature column by using the tag value corresponding to each sample and multiple features in the feature column; and/or an information gain calculation module 52 configured to determine an IG of the feature column by using the tag value corresponding to each sample and multiple features in the feature column.

In some embodiments, a threshold corresponding to the IV is a first threshold, and a threshold corresponding to the IG is a second threshold.

In some embodiments, first dimension reduction module 503 can be configured to: perform dimension reduction processing on the M feature columns by using a minwise Hashing algorithm to generate P feature columns, wherein $P=k \times 2^b$, and k and b are algorithm specified parameters.

In some embodiments, the machine learning algorithm model is a classification algorithm model or a regression algorithm model.

System 500 for training a model by using training data can determine an IV and/or an IG of each feature column, and reduce dimensions of original training data with high feature dimensions by retaining important features and reducing dimensions of auxiliary features. When the dimension-reduced training data is input to a model for training, objectives of making training feature parameters controllable, significantly reducing training data and improving operation efficiency can be achieved. Meanwhile, as the embodiments of the present disclosure retain the important features while reducing dimensions of the auxiliary features, the feature fingerprint can still comprehensively reflect the original training data, and a decrease in prediction accuracy of the model is minimized. The method for training a model by using training data proposed in the present disclosure has a particularly evident effect when applied to the training data with high-dimension sparse features, for example, advertisement CTR data. With the foregoing changes on the advertisement CTR data with 100,000,000 features, the AUC is improved by 2% compared with the full-amount training, and the data amount is 1% of the original data amount.

Figure 8:
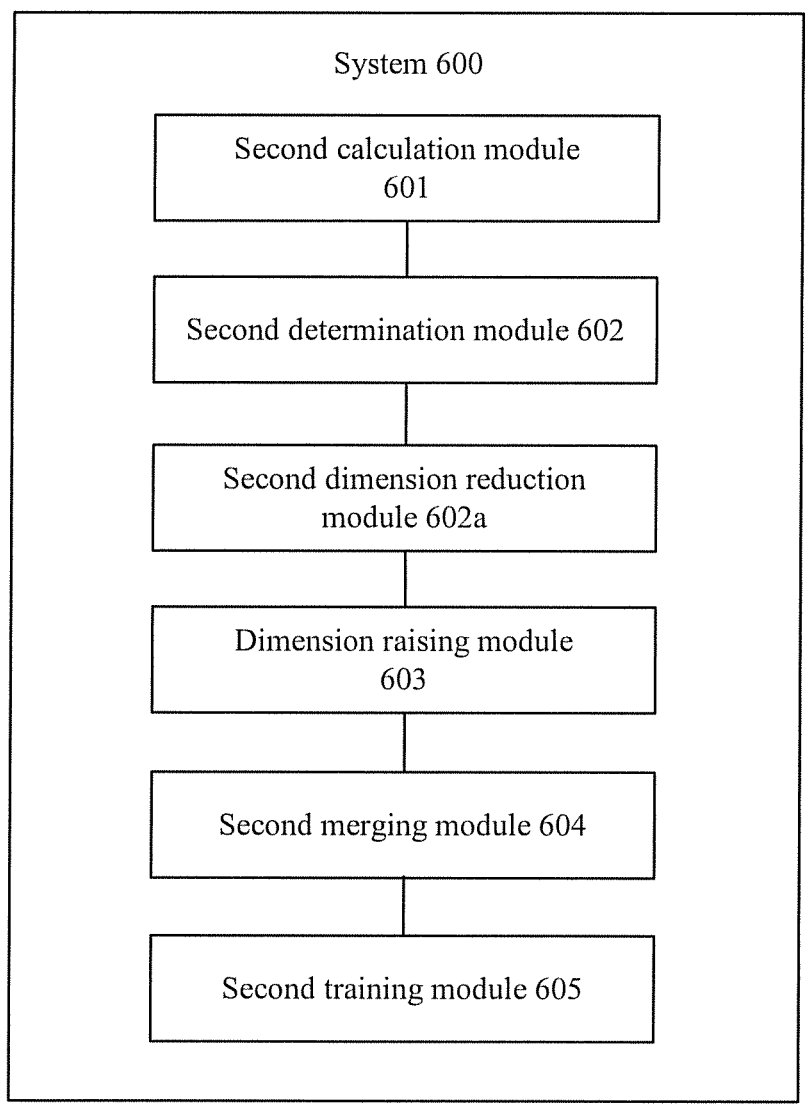
FIG. 8 is a block diagram of a system for training a model by using training data according to embodiments of the present disclosure.

Embodiments of the present disclosure further provide a system for training a model by using training data. The training data includes multiple samples, each sample includes N features, and corresponding features in the multiple samples form N feature columns. FIG. 8 is a schematic diagram of a system 600 for training a model by using training data and the training data, according to embodiments of the present disclosure. System 600 can include: a second calculation module 601, a second judgment module 602, a dimension raising module 603, a second merging module 604, and a second training module 605.

Second calculation module 601 can be configured to determine an importance value of each feature column.

Second judgment module 602 can be configured to determine whether the importance value of each feature column is greater than a corresponding threshold.

Dimension raising module 603 can be configured to perform dimension raising processing on Q feature columns to generate R feature columns when it is determined that the importance values of the Q feature columns in the N feature columns are greater than the corresponding threshold, wherein R>Q and Q<N.

Second merging module 604 can be configured to merge the R feature columns generated after the dimension raising processing and (N−Q) feature columns having importance values that are less than or equal to the corresponding threshold to obtain (R+N−Q) feature columns.

Second training module 605 can be configured to input training data including the (R+N−Q) feature columns to a machine learning algorithm model to train the machine learning algorithm model.

In some embodiments, dimension raising module 603 can be configured to: perform dimension raising processing on the Q feature columns by using a minwise Hashing algorithm to generate R feature columns, wherein $R=k \times 2^b$, and k and b are algorithm specified parameters.

In some embodiments, the machine learning algorithm model is a classification algorithm model or a regression algorithm model.

In some embodiments, the system further includes: a second dimension reduction module 602a configured to perform dimension reduction processing on M feature columns to generate P feature columns when it is determined that the importance values of the M feature columns in the N feature columns are less than the corresponding threshold, wherein M<N and P<M.

Second merging module 604 can be configured to: merge the R feature columns generated after the dimension raising processing and the P feature columns generated after the dimension reduction processing.

System 600 for training a model by using training data can determine an importance value of each feature column, and can raise dimensions of training data with high importance values in small-scale training data by raising dimensions of important features, thus improving the accuracy of model training.

The apparatus embodiments provide components that perform functionality that is at least similar to the functionality in the method embodiments, so they are described simply. For related parts, reference can be made to the descriptions in the method embodiments.

The embodiments in the specification are described progressively, each embodiment emphasizes a part different from other embodiments, and identical or similar parts of embodiments can be obtained with reference to each other.

It is appreciated that, embodiments of the present disclosure can be provided as a method, an apparatus, or a computer program product. Therefore, embodiments of present disclosure may be implemented as a complete hardware embodiment, a complete software embodiment, or an embodiment combining software and hardware. Moreover, embodiments of the present disclosure can be in the form of a computer program product implemented on one or more computer usable storage media (including, but not limited to, a magnetic disk memory, a CD-ROM, an optical memory and the like) including computer usable program codes.

In some embodiments, the computer device includes one or more central processing units (CPUs), an input/output interface, a network interface, and a memory. The memory can include computer readable media such as a volatile memory, a Random Access Memory (RAM), and/or non-volatile memory, e.g., a Read-Only Memory (ROM) or a flash RAM. The memory is an example of a computer readable medium. The computer readable medium includes non-volatile and volatile media as well as movable and non-movable media, and can implement signal storage by means of any method or technology. The signal can be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to a computing device. According to the definition in this text, the computer readable medium does not include transitory media, such as a modulated data signal and a carrier.

Embodiments of the present disclosure are described with reference to flowcharts and/or block diagrams of the method, terminal device (system) and computer program product according to embodiments of the present disclosure. It is appreciated that a computer program instruction can be used to implement each process and/or block in the flowcharts and/or block diagrams and combinations of processes and/or blocks in the flowcharts and/or block diagrams.

These computer program instructions can be provided to a computer, an embedded processor, or a processor of any other programmable data processing terminal device to generate a machine, so that the instructions executed by a computer or a processor of any other programmable data processing terminal device generate an apparatus for implementing a function specified in one or more processes in the flowcharts and/or in one or more blocks in the block diagrams.

These computer program instructions can also be stored in a computer readable memory that can instruct a computer or any other programmable data processing terminal device to work in a particular manner, such that the instructions stored in the computer readable memory generate an article of manufacture that includes an instruction apparatus. The instruction apparatus implements a function specified in one or more processes in the flowcharts and/or in one or more blocks in the block diagrams.

These computer program instructions can also be loaded onto a computer or another programmable data processing terminal device, such that a series of operation steps are performed on the computer or another programmable device, thus generating computer-implemented processing. Therefore, the instructions executed on the computer or another programmable device provide steps for implementing a function specified in one or more processes in the flowcharts and/or in one or more blocks in the block diagrams.

Although embodiments of the present disclosure have been described, it is appreciated that additional changes and modifications can be made to these embodiments. Therefore, the appended claims are intended to be illustrated as including embodiments and all changes and modifications falling in the scope of the embodiments of the present disclosure.

Finally, it should be further noted that, in this text, the relational terms such as "first" and "second" are merely used to distinguish one entity or operation from another entity or operation, and do not necessarily require or imply any such actual relationship or sequence between these entities or operations. Moreover, the terms "include", "comprise" or their other variations are intended to cover non-exclusive inclusion, so that a process, a method, an object or a terminal device including a series of elements not only includes the elements, but also includes other elements not clearly listed, or further includes inherent elements of the process, method, object or terminal device. In a case without any more limitations, an element defined by "including a/an . . . " does not exclude that the process, method, object or terminal device including the element further has other identical elements.

What is claimed is:

1. A method for training a model by using training data, wherein the training data comprises a plurality of samples, each sample comprises N features, and features in the plurality of samples form N feature columns, and the method comprises:
   determining an importance value of each of the N feature columns;
   determining whether the importance value of each of the N feature columns satisfies a threshold condition;
   performing, among the N feature columns, a dimension reduction on M feature columns to generate P feature columns in response to a determination that importance values of the M feature columns do not satisfy the threshold condition, wherein M<N and P<M;
   merging (N−M) feature columns having importance values that satisfy the threshold condition and the generated P feature columns to obtain (N−M+P) feature columns; and
   training the model based on the training data including the (N−M+P) feature columns.

2. The method according to claim 1, wherein performing, among the N feature columns, the dimension reduction on M feature columns to generate P feature columns in response to the determination that the importance values of the M feature columns do not satisfy the threshold condition further comprises:
   in response to the determination that the importance values of M feature columns in the N feature columns do not satisfy the threshold condition, performing dimension reduction processing on the M feature columns by using a minwise Hashing algorithm to generate P feature columns, wherein $P=k \times 2^b$, and k and b are specified by the minwise Hashing algorithm.

3. The method according to claim 1, wherein the importance values of the (N−M) feature columns are greater than or equal to a threshold.

4. The method according to claim 1, wherein the training data further comprises a tag value corresponding to each sample, and determining an importance value of each of the N feature columns comprises:
   determining at least one of an information value and an information gain of each of the N feature columns by using the tag value and features in each of the N feature columns, and
   using the at least one of the information value and the information gain as the importance value.

5. The method according to claim 4, wherein a threshold corresponding to the information value is a first threshold, and a threshold corresponding to the information gain is a second threshold.

6. The method according to claim 1, wherein the model is a classification algorithm model or a regression algorithm model.

7. A system for training a model by using training data, wherein the training data comprises a plurality of samples, each sample comprises N features, and features in the samples form N feature columns, and the system comprises:
   a memory storing a set of instructions; and
   one or more processors configured to execute the set of instructions to cause the system to perform:
   determining an importance value of each of the N feature columns;
   determining whether the importance value of each feature column satisfies a threshold condition;
   performing, among the N feature columns, a dimension reduction on M feature columns to generate P feature columns in response to a determination that importance values of the M feature columns in the N feature columns do not satisfy the threshold condition, wherein M<N and P<M;
   merging (N−M) feature columns having importance values that satisfy the threshold condition and the generated P feature columns to obtain (N−M+P) feature columns; and
   training the model based on the training data comprising the (N−M+P) feature columns.

8. The system according to claim 7, wherein the one or more processors are configured to execute the set of instructions to cause the system to further perform:
   performing the dimension reduction on the M feature columns by using a minwise Hashing algorithm to generate the P feature columns, wherein $P=k \times 2^b$, and k and b are specified by the minwise Hashing algorithm.

9. The system according to claim 7, wherein the training data further comprises a tag value corresponding to each sample, and the one or more processors are configured to execute the set of instructions to cause the system to further perform:
   determining at least one of an information value and an information gain of each of the N feature columns by using the tag value and features in each of the N feature columns, and
   using the at least one of the information value and the information gain as the importance value.

10. The system according to claim 9, wherein a threshold corresponding to the information value is a first threshold, and a threshold corresponding to the information gain is a second threshold.

11. The system according to claim 7, wherein the model is a classification algorithm model or a regression algorithm model.

12. The system according to claim 7, wherein the importance values of the (N−M) feature columns are greater than or equal to a threshold.

13. A non-transitory computer readable medium that stores a set of instructions that is executable by at least one processor of a computer system to cause the computer system to perform a method for training a model by using training data, wherein the training data comprises a plurality of samples, each sample comprises N features, and features in the plurality of samples form N feature columns, and the method comprises:
   determining an importance value of each of the N feature columns;
   determining whether the importance value of each of the N feature columns satisfies a threshold condition;
   performing, among the N feature columns, a dimension reduction on M feature columns to generate P feature columns in response to a determination that importance values of the M feature columns do not satisfy the threshold condition, wherein M<N and P<M;
   merging (N−M) feature columns having importance values that satisfy the threshold condition and the generated P feature columns to obtain (N−M+P) feature columns; and
   training the model based on the training data including the (N−M+P) feature columns.

14. The non-transitory computer readable medium according to claim 13, wherein performing, among the N feature columns, the dimension reduction on M feature columns to generate P feature columns in response to the determination that the importance values of the M feature columns do not satisfy the threshold condition further comprises:

in response to the determination that the importance values of M feature columns in the N feature columns do not satisfy the threshold condition, performing dimension reduction processing on the M feature columns by using a minwise Hashing algorithm to generate P feature columns, wherein $P=k\times2^b$, and k and b are specified by the minwise Hashing algorithm.

15. The non-transitory computer readable medium according to claim 13, wherein the importance values of the (N-M) feature columns are greater than or equal to a threshold.

16. The non-transitory computer readable medium according to claim 13, wherein the training data further comprises a tag value corresponding to each sample, and determining an importance value of each of the N feature columns comprises:

determining at least one of an information value and an information gain of each of the N feature columns by using the tag value and features in each of the N feature columns, and using the at least one of the information value and the information gain as the importance value.

17. The non-transitory computer readable medium according to claim 16, wherein a threshold corresponding to the information value is a first threshold, and a threshold corresponding to the information gain is a second threshold.

18. The non-transitory computer readable medium according to claim 13, wherein the model is a classification algorithm model or a regression algorithm model.

* * * * *